(12) United States Patent  (10) Patent No.: US 8,959,005 B2
Olsson et al.  (45) Date of Patent: Feb. 17, 2015

(54) BUILDING ENVELOPE DETERMINATION

(75) Inventors: Thomas Olsson, Manchester, NH (US); John Mitchell, Encinitas, CA (US)

(73) Assignee: Autodesk, Inc., San Rafael, CA (US)

( * ) Notice: Subject to any disclaimer, the term of this patent is extended or adjusted under 35 U.S.C. 154(b) by 572 days.

(21) Appl. No.: 13/362,650

(22) Filed: Jan. 31, 2012

(65) Prior Publication Data

US 2013/0197868 A1    Aug. 1, 2013

(51) Int. Cl.
*G06F 17/50* (2006.01)
(52) U.S. Cl.
USPC ............................................................. 703/1
(58) Field of Classification Search
None
See application file for complete search history.

(56) References Cited

U.S. PATENT DOCUMENTS 6,928,331 B2 *   8/2005  Wishengrad ..................... 700/98
7,142,726 B2 *  11/2006  Ziegler et al. .................. 382/285

OTHER PUBLICATIONS

Vanegas et al., "Building reconstruction using manhattan-world grammars", IEEE Conference on Computer Vision and Pattern Recognition (CVPR), Jun. 2010, pp. 358-365.*

* cited by examiner

*Primary Examiner* — Thai Phan
*Assistant Examiner* — Herng-Der Day
(74) *Attorney, Agent, or Firm* — Fish & Richardson P.C.

(57) ABSTRACT

Methods, systems, and apparatus, including computer programs encoded on a computer storage medium, for determining a building envelope. In one aspect, a method includes generating two-dimensional analytical faces; generating a three-dimensional shell bounding box that encompasses the analytical faces; determining, for each analytical face, one or more sample points; performing a flood-fill algorithm from a reference grid cell through other grid cells in the shell bounding box; casting one or more primary rays from each grid cell encountered by the flood-fill algorithm that does not contain any of the sample points but that directly neighbors a grid cell that does contain a sample point; for each ray, identifying as an exterior face the first analytical face within a vicinity of the grid cell from which the ray is cast that is intersected by the ray; and generating a building envelope based on the identified exterior faces.

30 Claims, 14 Drawing Sheets
(10 of 14 Drawing Sheet(s) Filed in Color)

BUILDING ENVELOPE DETERMINATION

BACKGROUND

This specification relates to building science, and particularly to analytical modeling of buildings.

Building science is a general term for fields of study that focus on the analysis of buildings. Building science generally includes the detailed analysis of building materials and building envelope systems. One example purpose of building science is to provide predictive capability to optimize building performance and understand or prevent building failures.

SUMMARY

In general, one aspect of the subject matter described in this specification can be embodied in methods that include the actions of generating a respective two-dimensional analytical face to represent each bounding element of a plurality of bounding elements that form at least a part of an analytical model; generating a three-dimensional shell bounding box that encompasses the analytical faces, the shell bounding box further comprising a plurality of three-dimensional grid cells arranged within the shell bounding box; determining, for each analytical face, one or more sample points on the analytical face; executing a flood-fill algorithm from a reference one of the grid cells through other ones of the grid cells in the shell bounding box; casting one or more primary rays from each one of the grid cells encountered by the flood-fill algorithm that does not contain any of the sample points but that directly neighbors one or more other ones of the grid cells that do contain one or more of the sample points; for each casted primary ray, identifying as an exterior face the first analytical face within a vicinity of the grid cell from which the primary ray is cast that is intersected by the casted primary ray as an exterior face; and generating a building envelope based on the identified exterior faces. Other embodiments of this aspect include corresponding systems, apparatus, and computer programs, configured to perform the actions of the methods, encoded on computer storage devices.

These and other aspects can optionally include one or more of the following features. Generating the respective two-dimensional analytical face to represent each bounding element of the plurality of bounding elements that form at least a part of the analytical model can include: receiving as input a plurality of building elements that collectively form the analytical model; and generating, for each of the building elements that is a bounding element, a two-dimensional analytical face to represent the bounding element.

Generating a three-dimensional shell bounding box that encompasses the analytical faces can include: determining a minimum element extent value based on one or more of the bounding elements; and generating a three-dimensional grid within the shell bounding box that comprises the plurality of grid cells, wherein the plurality of grid cells collectively fill the shell bounding box, each one of the grid cells having a dimension based on the minimum element extent value.

Generating a three-dimensional shell bounding box that encompasses the analytical faces can include: generating a first bounding box that encompasses the bounding elements based on the bounding elements such that the first bounding box is separated from the analytical face closest to the first bounding box by at least the minimum element extent value; determining a cell size value based on the minimum element extent value; and generating the shell bounding box such that the shell bounding box encompasses the first bounding box by at least the cell size value at all portions of the shell bounding box and such that each one of the grid cells has a dimension equal to the cell size value.

Casting one or more primary rays from each one of the grid cells encountered by the flood-fill algorithm that does not contain any of the sample points but that directly neighbors one or more other ones of the grid cells that do contain one or more of the sample points can include: identifying as a bounding element cell that is not in a space, each grid cell that contains a sample point; identifying as a fringe cell, each grid cell encountered by the flood-fill algorithm that is not a bounding element cell but that directly neighbors one or more ones of the bounding element cells; and casting the one or more primary rays from each one of the fringe cells.

The method can further include: for each casted primary ray that intersects an analytical face, calculating a specular reflected ray based on the casted primary ray; casting the respective specular reflected ray; and identifying as an exterior face the first analytical face intersected by the casted specular ray that is not also intersected by any one of the casted primary rays.

Casting one or more rays from each one of the fringe cells can include casting the one or more rays from a center point of the fringe cell, and wherein casting one or more rays from the center point of the fringe cell comprises casting a first primary ray perpendicularly through each face of the fringe cell.

The method can further include for each first primary ray that is not directed along a first axis that passes through the center point of the fringe cell and that is perpendicular to a first face of the fringe cell, casting a second primary ray along a direction that is 45 degrees rotated about the first axis; for each first primary ray that is not directed along a second axis that passes through the center point of the fringe cell and that is perpendicular to a second face of the fringe cell that is perpendicular to the first face, casting a third primary ray along a direction that is 45 degrees rotated about the second axis; and for each first primary ray that is not directed along a third axis that passes through the center point of the fringe cell and that is perpendicular to both the first and second axes, casting a fourth primary ray along a direction that is 45 degrees rotated about the third axis.

The method can further include for each second primary ray and third primary ray, casting a fifth primary ray along a direction that is 45 degrees rotated about the third axis.

Casting one or more primary rays from each one of the grid cells encountered by the flood-fill algorithm that does not contain any of the sample points but that directly neighbors one or more other ones of the grid cells that do contain one or more of the sample points can include casting the one or more rays in randomly-generated directions from the one of the grid cells.

Particular embodiments of the subject matter described in this specification can be implemented to realize one or more of the following advantages. Building envelopes for a proposed or existing building can be efficiently, rapidly, and accurately determined. Additionally, spatial volumes in a building and the building elements dividing these special volumes can be efficiently, rapidly, and accurately identified.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1:
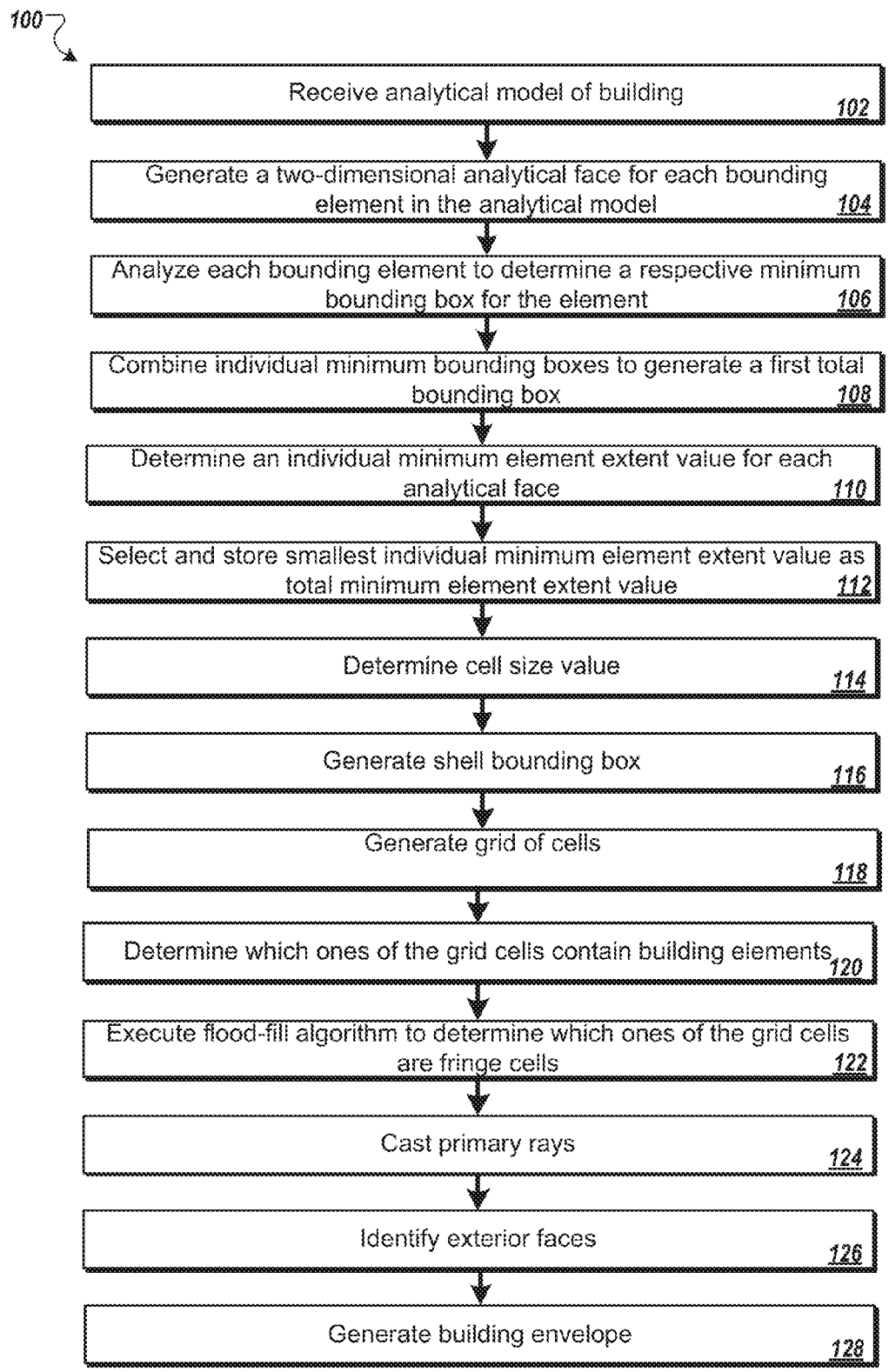
FIG. 1 is a flow diagram of an example technique for determining a building envelope.

FIG. 1 is a flow diagram of an example technique 100 for determining a building envelope using an analytical model. A building envelope can be defined as the collection of physical building elements (e.g., walls or wall elements, windows or window elements, roofs or roof elements, and, in some implementations, floors or floor elements) that are exposed to the outside environment surrounding an existing or proposed building or other structure (hereinafter collectively "building"). Knowledge of which physical building elements are part of the building envelope may be useful for, for example, thermal and energy analyses of the building. It may also be important to know which analytical spatial elements (e.g., spaces or voids between adjacent building elements) are exterior to or interior to the building.

At a high level, example technique 100 involves a combination of a flood-fill algorithm and ray-casting techniques. In an example implementation, technique 100 begins with receiving, at 102, an analytical model of a building.

Figure 2A:
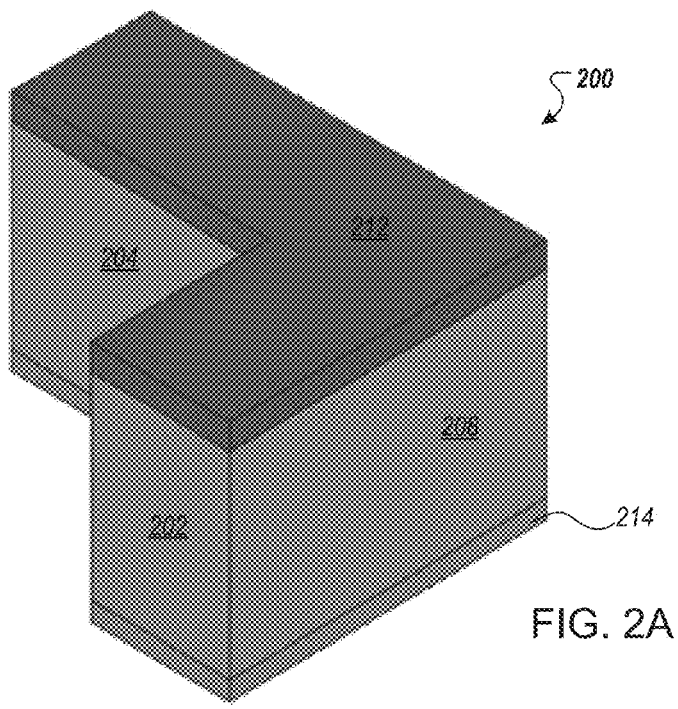
FIG. 2A illustrates an isometric view of a shaded rendering of an example building.
Figure 2B:
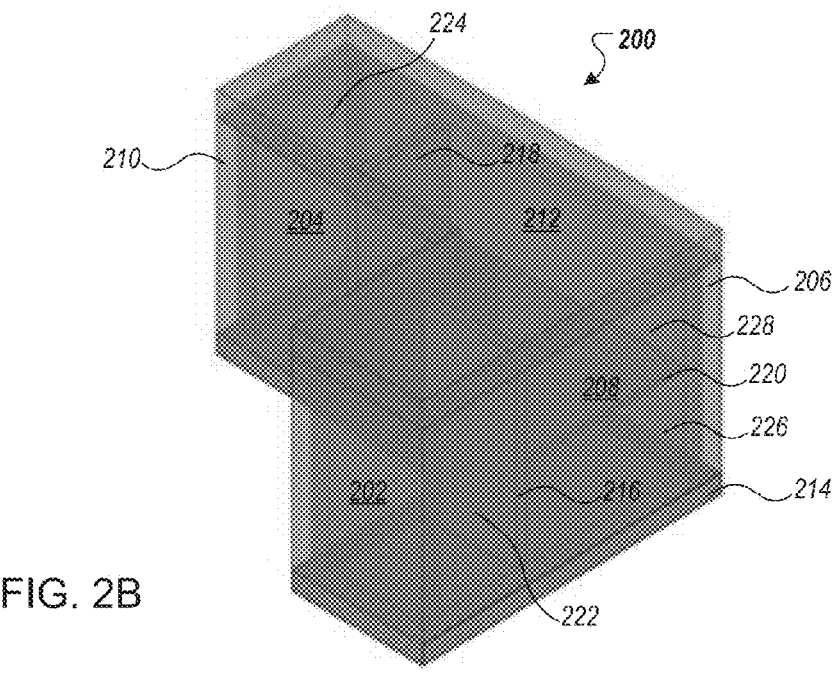
FIG. 2B illustrates an isometric view of a partially-transparent rendering of the example building of FIG. 2A.

FIGS. 2A and 2B illustrate isometric views of an example building model 200 of an example building design. In some implementations, building model 200 is a Building Information Modeling (BIM) model or otherwise modeled with BIM software or a combination of BIM software and other design or modeling software. FIG. 2A illustrates a shaded rendering of example building model 200 while FIG. 2B illustrates a partially-transparent rendering of building model 200. Example building model 200 includes a number of example building elements including first front wall 202, second front wall 204, rear wall 206, first side wall 208, second side wall 210, roof 212, floor 214, first inner wall 216, second inner wall 218, and intermediate floor 220, which together form spatial elements (e.g., rooms) 222, 224, 226, and 228.

In some implementations, only the building elements that are directly exposed to the environment outside of building 200 are considered and designated as bounding building elements (hereinafter "bounding elements"). Thus, in this context, a bounding element is a building element that can bound rooms, spaces, voids, or zones, such as spatial elements 222, 224, 226, and 228, and, additionally, is exposed to the outside environment of building 200. For example, in some implementations, a user who receives or generates building model 200 can designate as bounding elements only first front wall 202, second front wall 204, rear wall 206, first side wall 208, second side wall 210, roof 212, and floor 214.

In some implementations, when the analytical building model is received, the first front wall 202, second front wall 204, rear wall 206, first side wall 208, second side wall 210, roof 212, and floor 214 are already designated as bounding elements. In other implementations, a user can designate each of first front wall 202, second front wall 204, rear wall 206, first side wall 208, second side wall 210, roof 212, and floor 214 as a bounding element. Additionally, in some implementations certain building elements such as, for, roof 212, can be automatically designated as bounding elements without further user input. In such implementations, or other implementations, it can be desirable or even necessary to not automatically consider certain other building elements as bounding. For example, some building portions can be made up of two or more building elements. As will be described next, a given wall can comprise two or more layered building elements that collectively form the wall in a "sandwich" construction technique. In such cases, a user can designate the outer wall element as a bounding element while not designating the other inner wall element or elements of the same wall as bounding elements.

Figure 3:
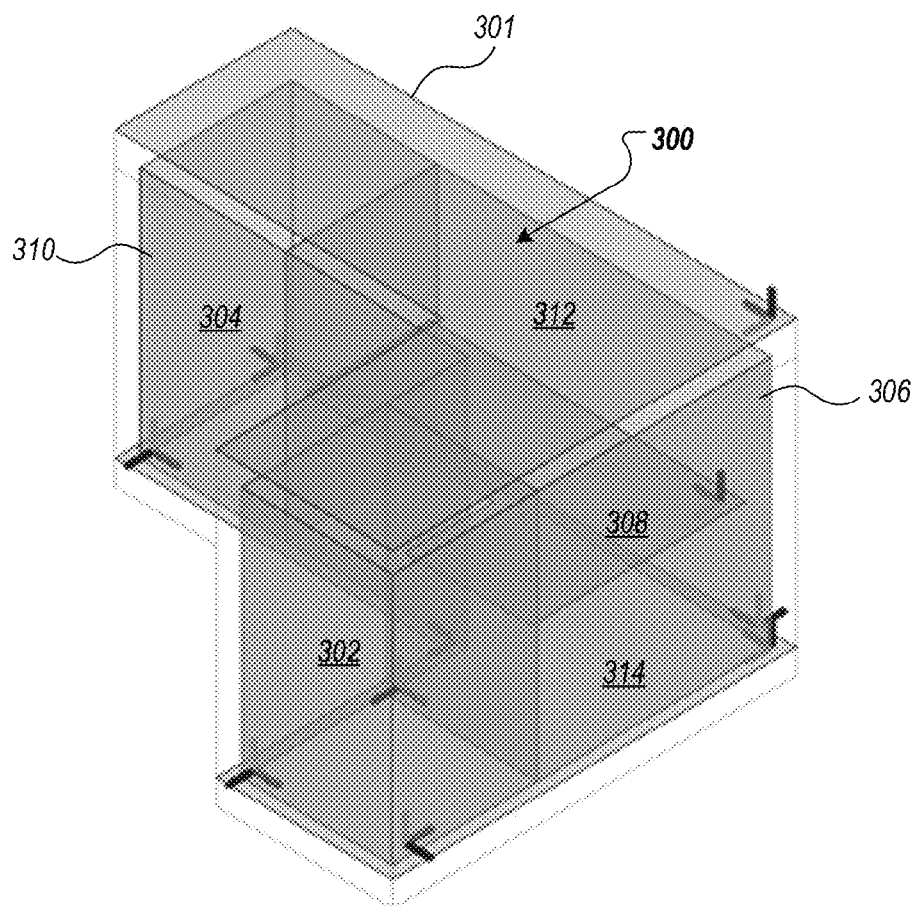
FIG. 3 illustrates an isometric view of an example analytical representation of the example building of FIGS. 2A-B in addition to an example first total bounding box that bounds the analytical representation.

Technique 100 proceeds with generating, at 104, a two-dimensional analytical face, surface, or plane (hereinafter "face") for each of the bounding elements within the received building model. For example, as the simplified analytical representation 300 of FIG. 3 illustrates, bounding building elements 202, 204, 206, 208, 210, 212, and 214 can be represented respectively as first front analytical face 302, second front analytical face 304, rear analytical face 306, first side analytical face 308, second side analytical face 310, roof analytical face 312, and floor analytical face 314.

In the illustrated implementation described with reference to FIGS. 2A-B, each of building elements 202, 204, 206, 208, 210, 212, 214, 216, 218, and 220 is represented by a single analytical face in analytical representation 300. In other implementations, as initially described above, each of building elements 202, 204, 206, 208, 210, 212, 214, 216, 218, and 220 can be represented as two or more layered or overlapping building elements. In some example applications, for example, wall 202 can be constructed according to "sandwich" or other layered or composite construction techniques in which wall 202 can itself be constructed from, for example, three or more distinct physical elements. For example, wall 202 can be constructed from an inner wall element (e.g., drywall), an insulation and support element (e.g., a combination of one or more of a wood or metal alloy frame and insulation), and an outer wall element (e.g., metal alloy, glass, wood, or brick, among other example materials and structures). As described above, in some implementations, only the outer wall element is considered as a bounding element that is subsequently represented by a two-dimensional analytical face that can form part of the building envelope.

Figure 12A:
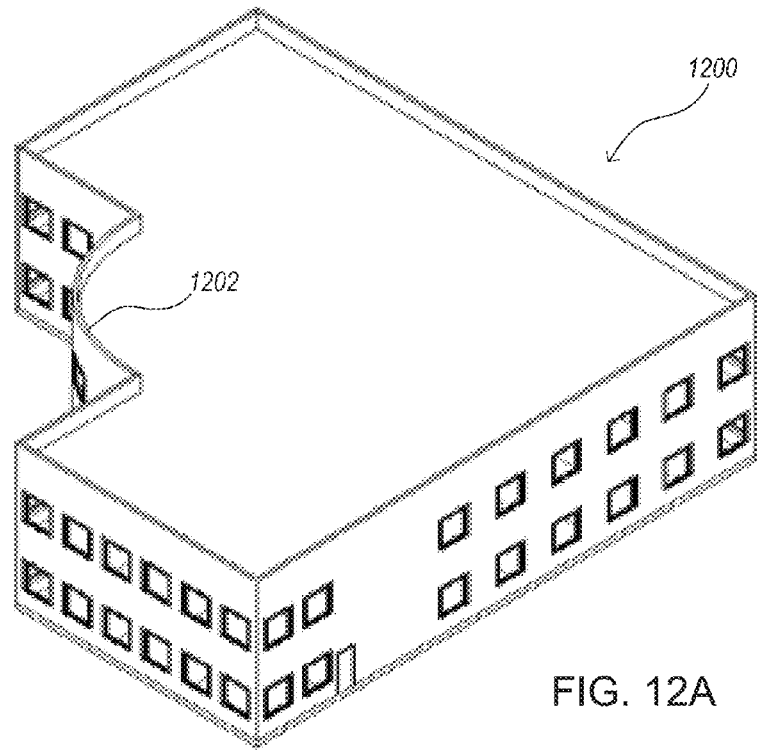
FIG. 12A illustrates an isometric view of an example building.
Figure 12B:
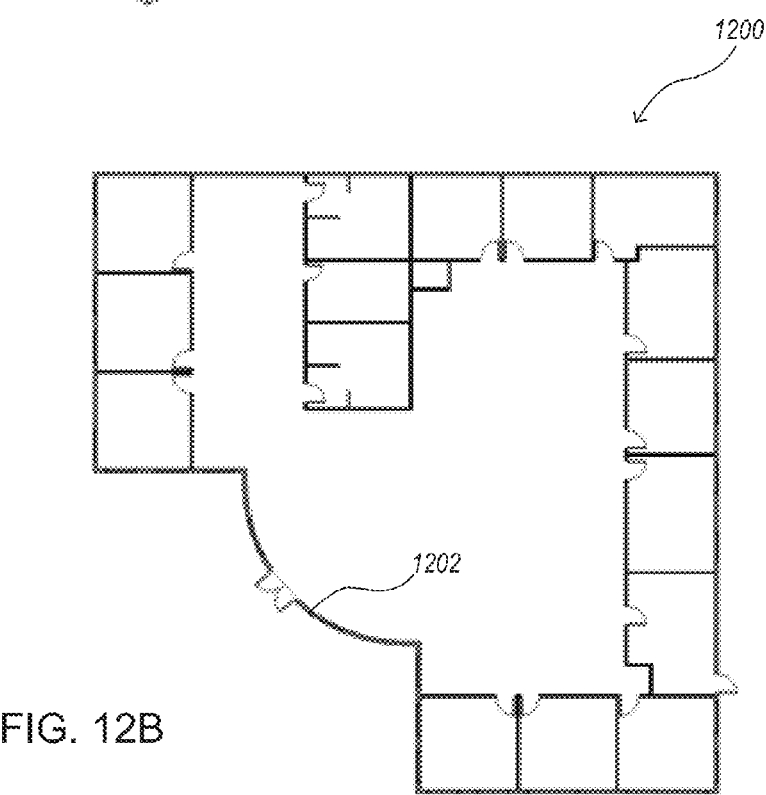
FIG. 12B illustrates a cross-sectional top view of the example building of FIG. 12A.
Figure 13:
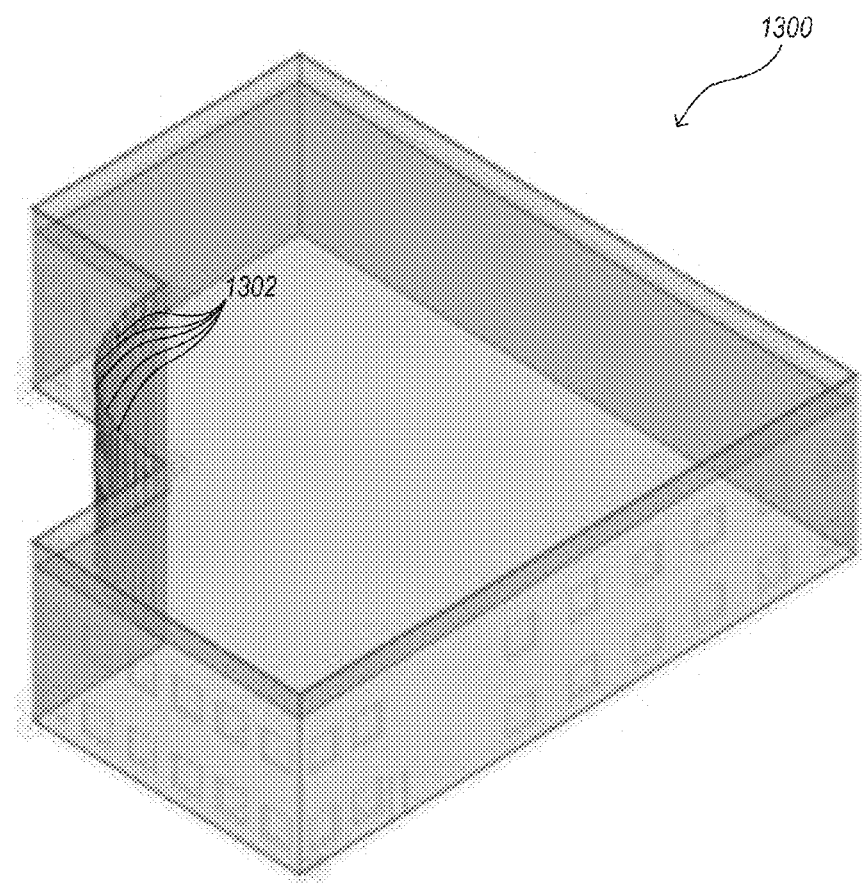
FIG. 13 illustrates an isometric view of an example building envelope that can be obtained for the example building of FIGS. 12A-B using the example method of FIG. 1.

Lastly, in some implementations, curved building elements can be represented as a multiple smaller two-dimensional flat analytical faces. That is, in these implementations, some or all of the two-dimensional analytical faces are flat non-curved faces or planes. Thus, curved building elements can be represented as a series of smaller flat faces. Note the curved building element 1202 of the example building 1200 illustrated in FIGS. 12A-B and its corresponding representation in the subsequently determined building envelope 1300 illustrated in FIG. 13, where the curved building element 1202 has been represented as a series of two-dimensional flat analytical faces 1302.

Returning to FIG. 1, prior to, concurrently with, or subsequent to generating an analytical face for each bounding element at 104, each bounding element or respective analytical face can be analyzed at 106 to determine a respective individual minimum bounding box for each bounding element/analytical face. For example, in one implementation, each of bounding elements 202, 204, 206, 208, 210, 212, and 214 are analyzed concurrently with generating respective analytical faces 302, 304, 306, 308, 310, 312, and 314 to determine an individual minimum bounding box for the respective bounding element. In an example implementation, the x, y, and z-axes (represented by the Cartesian coordinate system axes proximate one corner of each individual bounding box) of each individual bounding box are aligned with the building model 200. In various implementations, each of the individual bounding boxes are summed or combined at 108 to generate a first total bounding box 301. In particular example implementations, the first total bounding box 301 is a polyhedron that generally follows or mirrors the shape of the analytical representation 300.

In some implementations, each individual bounding box, respective bounding element, or respective analytical face is further analyzed at 110 to determine a respective individual minimum element extent value for each of the respective analytical faces 302, 304, 306, 308, 310, 312, and 314. Each minimum element extent value can be calculated by comparing the length, depth, and height of each individual bounding box to a current minimum element extent value (which may start at zero or some other small value initially) and the smallest of the values is set to the new current minimum element extent value.

The smallest of the computed individual minimum element extent values is selected and stored at 112 as the total minimum element extent value. After all bounding elements have been analyzed, the total minimum element extent value can be used as a baseline value to compute the cell size value (or simply "cell size") at 114 used in generating the grid 500 described below. In some implementations, the cell size (e.g., length, depth, and height) of the cells in the grid can each be automatically set at 114 to the computed total minimum element extent value. Alternatively, the cell size can be set to the computed total minimum element extent value rounded up to the nearest higher integer number but not less than a certain threshold value. For example, a default threshold value suitable for some applications may be 3 feet (ft.). However, there is generally a tradeoff between computational speed, where a larger cell size is desirable, and detail capture, where a smaller cell size is desirable. In some implementations, the threshold value can be adjusted after the total minimum element extent value is computed, or even set at the start or at a later time by a user. In various implementations, the first total bounding box 301 is larger than the analytical representation 300 (that is, farther from the closest one of the analytical faces) by at least the cell size value.

Figure 4:
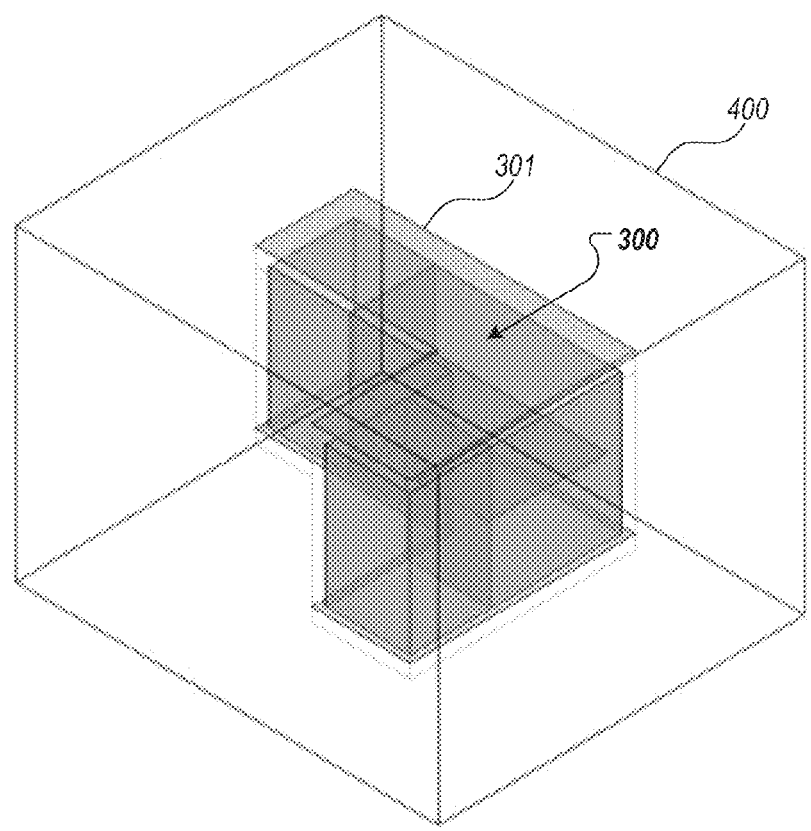
FIG. 4 illustrates an isometric view of an example shell bounding box that encompasses the example first total bounding box and example analytical representation of FIG. 3.

FIG. 4 illustrates an isometric view of a shell bounding box 400 generated at 116 by inflating the first total bounding box 301 by at least the cell size value; that is, such that the shell bounding box 400 is larger than the first total bounding box 301 by at least the cell size value along every dimension. In some example implementations, the shell bounding box 400 is larger than the first total bounding box 301 by at least a multiple of the cell size value along every dimension. In some example implementations, the multiple is in the range of 1.2 to 1.5. In other implementations, the shell bounding box 400 can be larger than the first total bounding box by a value less than the cell size value along each dimension.

In some implementations, the shell bounding box 400 is a polyhedron, e.g., a cuboid or cube. Having shell bounding box 400 shaped as a cuboid or cube can make computation less computationally intensive and the technique 100 more accurate. In other implementations, the shell bounding box 400 can be other suitable shapes for particular applications.

Figure 5:
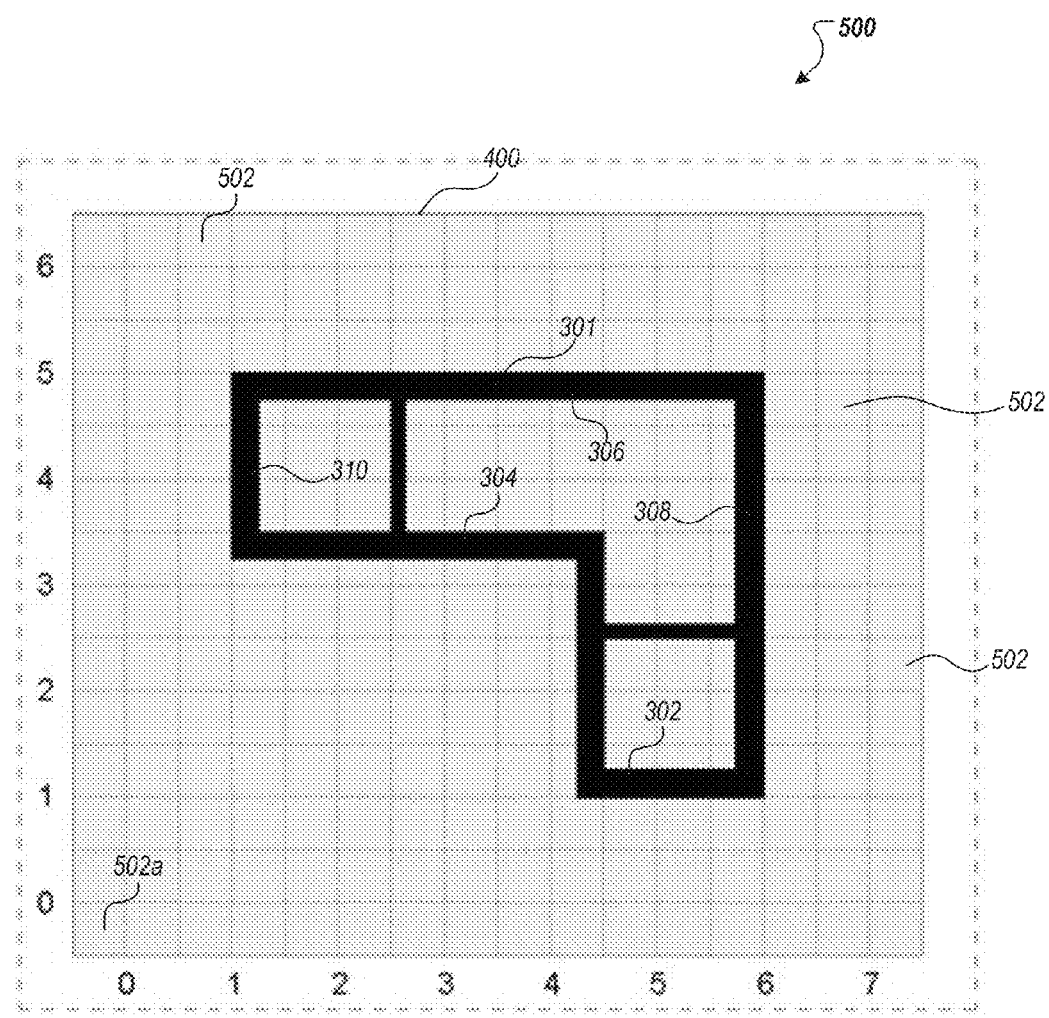
FIG. 5 illustrates a cross-sectional top view of the shell bounding box and analytical representation of FIG. 4 together with an example grid.

Returning to FIG. 1, at 118, a three-dimensional grid of three-dimensional cells is generated, e.g., the three-dimensional grid 500 with three-dimensional cells 502 illustrated in FIG. 5.

The grid 500 can be a uniform grid of uniformly shaped and sized cells 502 that entirely fill shell bounding box 400. In some implementations, each of cells 502 is a cube having a length dimension equal to the cell size value. It may be desirable in various implementations to generate a cubical shell bounding box 400 having a grid 500 that includes a uniform grid of uniform cubical cells 502 that collectively entirely fill shell bounding box 400. That is, the length, depth, and height of the shell bounding box 400 can each have a dimension that is a multiple of the cell size value, and in particular implementations, the length, depth, and height of shell bounding box 400 are equal.

Although FIG. 5 illustrates a cross-sectional top view of cubical shell bounding box 400 and analytical representation 300 together with example grid 500 of uniform cubical cells 502, those of skill in the art will readily be able to extrapolate this two-dimensional visualization to three dimensions.

In various implementations, technique 100 proceeds with determining, at 120, which ones of the grid cells, e.g., grid cells 502 of FIG. 5, contain one or more portions of one or more of the building elements, e.g., building elements 202, 204, 206, 208, 210, 212, and 214 (and in other implementations, building elements 216, 218, and 220) of FIG. 2B.

Figure 6:
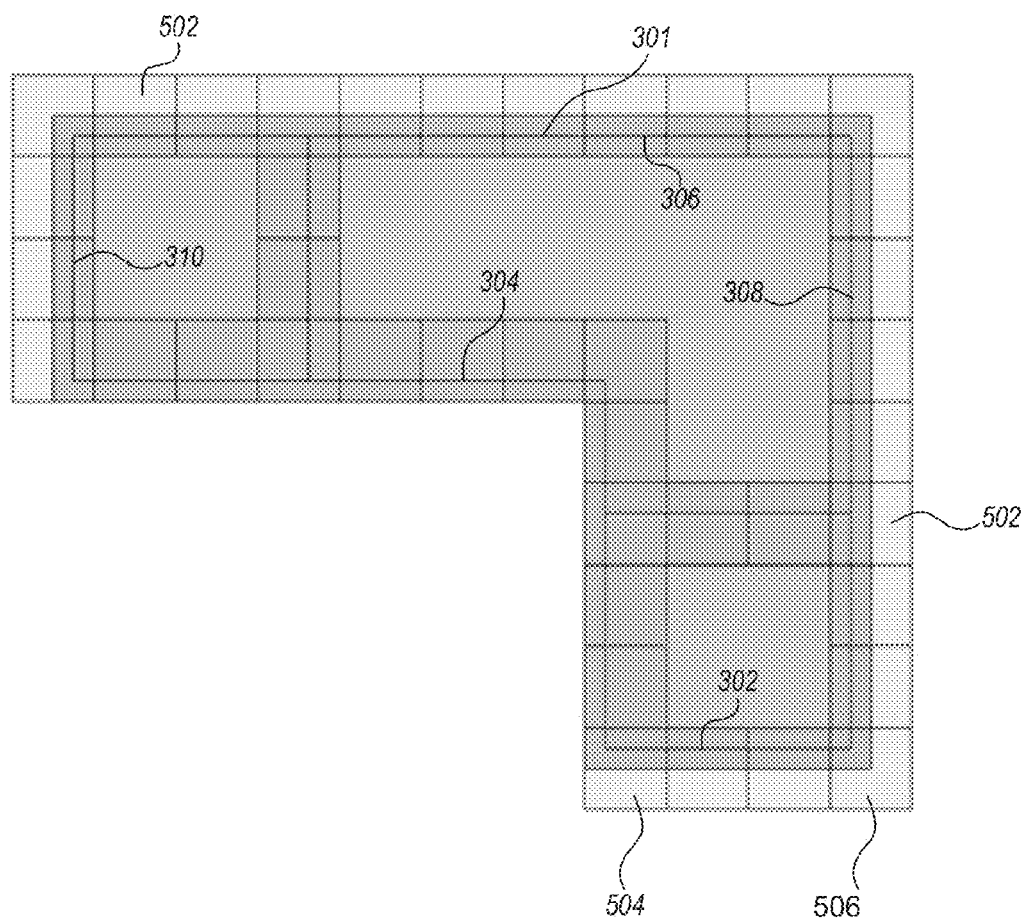
FIG. 6 illustrates a cross-sectional top view of the shell bounding box and analytical representation of FIG. 5 after the ones of the grid cells containing building elements have been determined.

FIG. 6 illustrates a cross-sectional top view of the shell bounding box 400 and analytical representation 300 of FIG. 5 after the grid cells 502 containing building elements have been determined. In an example implementation, step 120 includes determining one or more sample points on each of the analytical faces 302, 304, 306, 308, 310, 312, and 314. For each sample point, the one of the grid cells 502 that the sample point is in is also computed and stored at 120. In a particular implementation, the grid bounding box, e.g., the minimum cell and the maximum cell, for each analytical face is also computed and cached at 120. For example, cell 504 can be computed as the minimum cell for the south-facing wall of FIG. 6 and cell 506 can be computed as the maximum cell for the south-facing wall.

This cached information can then be used for quick rejection and exclusion of analytical faces in one or more of the steps described below (e.g., since the computations involve simple arithmetic, using integer values will make such computations computationally fast).

In an example implementation, after the grid cells containing building elements have been identified at 120, the technique 100 proceeds with determining which of the grid cells are outside of the analytical representation and which ones of the grid cells are fringe cells at 122. In a particular example implementation, to determine which of the grid cells 502 are outside the analytical representation 300, a flood-fill algorithm is executed. Generally, flood-fill algorithms (also sometimes referred to as "seed-fill algorithms") refer to algorithms that can be used to determine the area connected to a given node in a multi-dimensional array. A flood-fill algorithm generally takes as input parameters, e.g., a start node (e.g., reference node) and one or more node criteria (e.g., a target node color). When executed, the flood-fill algorithm then looks for all nodes in the multi-dimensional array that are connected to the start node by a path through other ones of the nodes that satisfy the node criteria (e.g., that are of the target color).

In some implementations, the flood-fill algorithm starts at the lower left corner of the cubical grid 500; that is, in grid cell 502a. In particular implementations, as described above, it is known that grid cell 502a is outside of the analytical representation because the shell bounding box 400 was generated at 116 such that it was outside (larger than) the analytical representation 300 and the first total bounding box 301 by at least the cell size value. During execution of the flood-fill algorithm the first cell 502a is "visited" to determine if it contains a building element. Cells that contain building elements are designated as "building element cells." At a high level, the flood-fill algorithm then proceeds to the first-neighbor cells 502 surrounding the first cell 502a. In one particular implementation, a first-neighbor cell is one of the six cells that share a common side or face with the cell currently being visited by the flood-fill algorithm. The flood-fill algorithm then carries on executing to the first neighbors of the first neighbors and so until each of the grid cells 502 is identified as a space cell (e.g., a cell not containing a building element), a building element cell, or a fringe cell (e.g., a cell adjacent to a building element cell).

At a more detailed lower level, the flood-fill algorithm can traverse or work through the cubical grid 500 as follows. First, an empty cell queue (stack of cells 502) is created. Second, the starting cell (e.g., cell 502a) is visited. Third, the start cell is then added to the end of the queue (it is "pushed"). Fourth, it is determined whether there are any cells remaining in the queue. If not, the flood-fill algorithm quits. If so, the technique identifies the first cell in the queue and removes it from the queue (it is "popped"). Next, each of the first cell's first-neighbor cells is visited. If the neighbor cell has already been visited, the next neighbor is visited. If the visited neighbor cell is a space cell, it is added to the end of the queue (it is pushed). The flood-fill algorithm then proceeds back to the fourth step with determining whether there are any cells remaining in the queue.

At an even more detailed lower level, the flood-fill algorithm can visit a cell and determine if the visited cell is a fringe cell as follows. The empty first grid cell 502a is visited. Next, grid cell 502a is marked as visited and marked as a space cell. This cell is then set as belonging to the "outside cluster," the connected region of the outside grid cells 502. Subsequently, the cell is checked to determine whether it is a fringe cell. If the cell has any first-neighbors that contain an analytical face, and thus a building element, the cell will be marked as a fringe cell. The flood-fill algorithm then proceeds to a next first-neighbor cell and so on.

Figure 7:
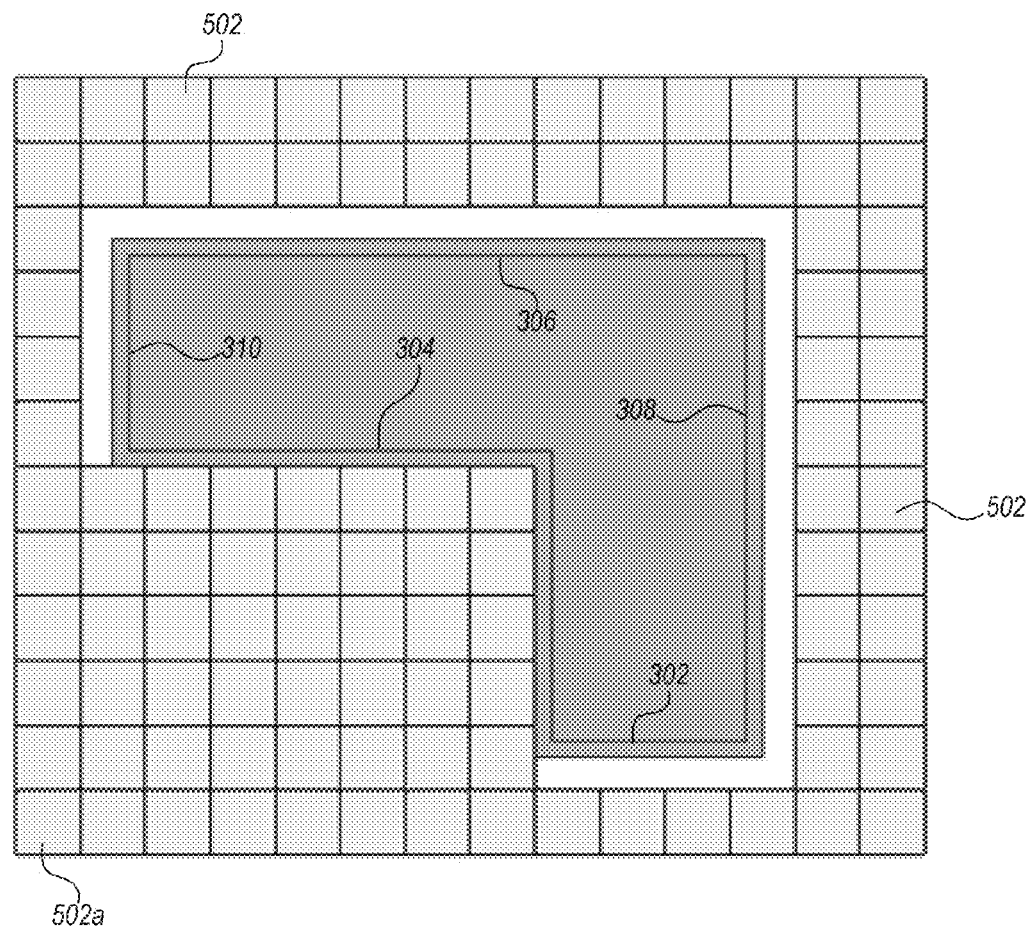
FIG. 7 illustrates a cross-sectional top view of the shell bounding box and analytical representation of FIG. 5 after the ones of the grid cells that are outside of the analytical representation have been determined and the other ones of the grid cells inside have been removed from the display.
Figure 8:
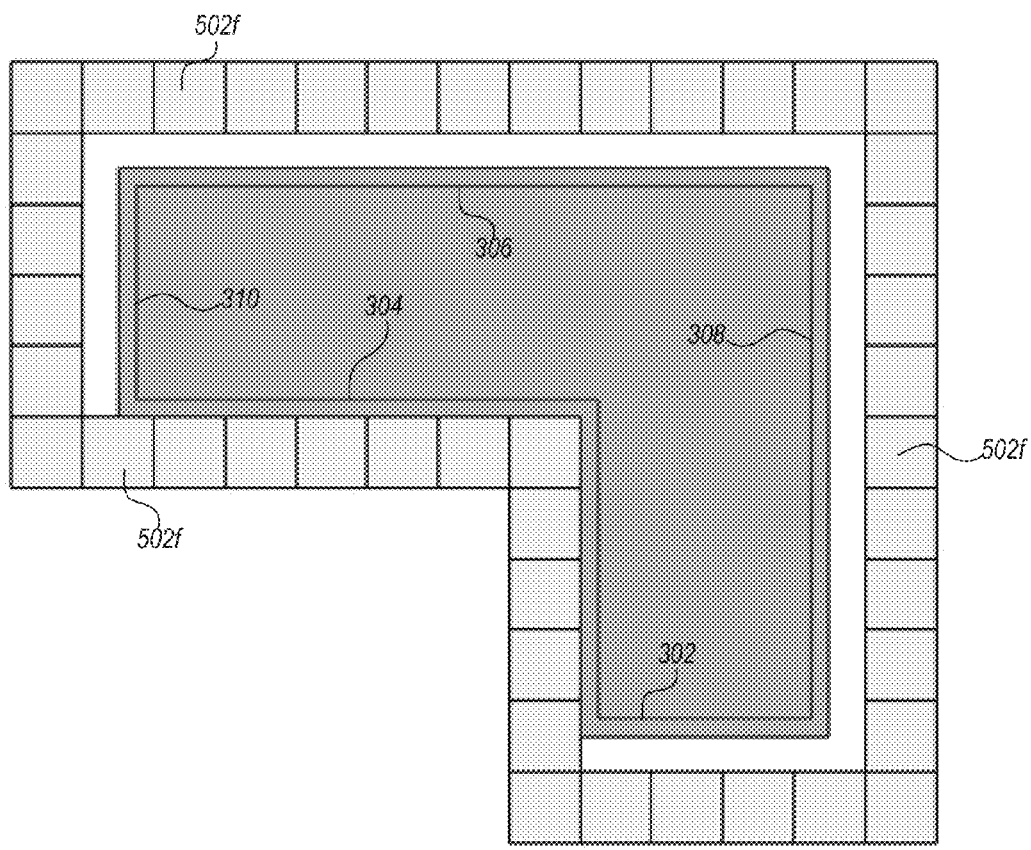
FIG. 8 illustrates the fringe cells obtained after executing the flood-fill algorithm on the grid cells of FIG. 7.

FIG. 7 illustrates a cross-sectional top view of the shell bounding box 400 and analytical representation 300 of FIG. 5 after the grid cells that are outside of the analytical representation 300 have been determined and the grid cells inside the analytical representation 300 have been removed from the display. FIG. 8 illustrates the fringe cells 502f obtained after executing the flood-fill algorithm on the grid cells of FIG. 7.

In various implementations, when a visited grid cell 502 is determined to be a fringe cell, one or more rays are cast from the cell at 124 to find analytical faces, and respective bounding elements, in proximity to the cell. Generally, ray casting (also sometimes referred to as "ray tracing") involves the use of ray-surface intersection tests. In particular, ray casting can be used to solve the general problem of determining the first object (e.g., analytical face) intersected by a ray (e.g., a primary ray). The high speed of calculation means that the ray-casting approach is not computationally intensive, and so, can be performed with minimal computational resources while still achieving rapid performance.

Figure 9A:
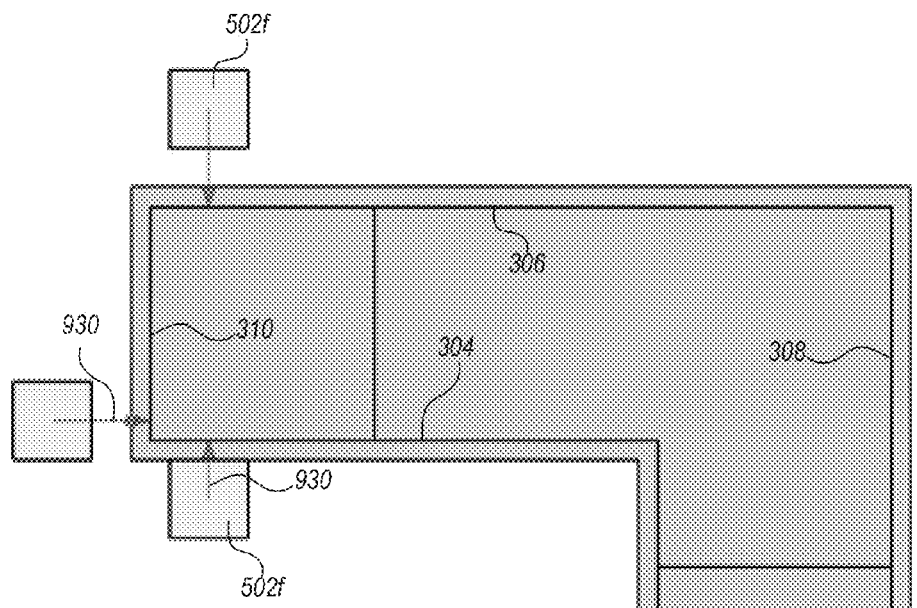
FIG. 9A illustrates an example of primary ray casting as applied to the fringe cells and analytical representation of FIG. 8.

FIG. 9A illustrates an example of primary ray casting as applied to the fringe cells and analytical representation of FIG. 8. In some example implementations, a plurality of rays 930 are cast from, for example, the center point of each fringe cell 502f. For example, first primary ray 930 can be cast at 124 perpendicularly through each face of the fringe cell. For each first primary ray 930 that is not directed along a first axis that passes through the center point of the fringe cell and that is perpendicular to a first face of the fringe cell, a second primary ray 930 is cast at 124 along a direction that is 45 degrees rotated about the first axis from the first primary ray 930. For each first primary ray 930 that is not directed along a second axis that passes through the center point of the fringe cell and that is perpendicular to a second face of the fringe cell that is perpendicular to the first face, a third primary ray 930 is cast at 124 along a direction that is 45 degrees rotated about the second axis from the first primary ray 930. For each first primary ray 930 that is not directed along a third axis that passes through the center point of the fringe cell and that is perpendicular to both the first and second axes, a fourth primary ray 930 is cast at 124 along a direction that is 45 degrees rotated about the third axis from the first primary ray 930. For each second primary ray 930 and third primary ray 930 that is cast, a fifth primary ray 930 is cast along a direction that is 45 degrees rotated about the third axis from the respective second primary ray 930 or respective third primary ray 930. In other implementations, the one or more primary rays 930 can be cast randomly or in other directions according to other ray casting schemes.

When it is determined that a primary ray 930 would hit, or did hit, an analytical face within the bounding box defined by the ones of the surrounding grid cells, the originating bounding element for the analytical face can be considered to be in the (or part of) the building envelope. This "vicinity" test can ensure that possible gaps or other small variations in the analytical building model are considered, since the rays 930 will only intersect analytical faces corresponding to building elements that are in close proximity in the model.

Figure 9B:
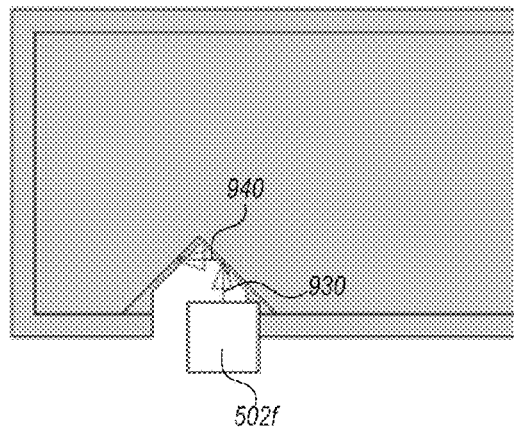
FIG. 9B illustrates an example of specular ray casting as applied to the fringe cells and analytical representation of FIGS. 8-9.

In some implementations, for each primary ray 930 that is cast and that hits an analytical face, a specular ray 940 is then cast that follows the line that a reflection of the respective primary ray 930 would make when reflected off of the intersected analytical face. In some implementations, specular reflected rays 940 are computed and cast only for a certain statically or dynamically predetermined or determined number of iterations. These specular rays can assist in finding small variations in the building envelope that primary rays may not "catch" or "see" depending on the cell size of the grid cells 502. FIG. 9B illustrates an example of specular ray casting as applied to the fringe cells and analytical representation of FIGS. 8 and 9A. In other implementations, specular rays could be computed and cast that represent reflections of other specular rays.

At a more detailed lower level, one example technique for ray casting can proceed as follows. First, a queue of primary rays 930 is created. In one implementation, there are six starting primary rays 930 in the directions of each of the first-neighbor cells 502 of the current fringe cell 502ƒ from which rays 930 are being computed and cast. These six primary rays 930 are created and pushed to the queue. The origin of each primary ray 930 can be, for example, the center of the respective fringe cell 502ƒ. Second, the technique checks whether there are any rays 930 in the queue. If not, the ray-casting technique for that fringe cell 930 ends. If so, the technique can then check whether a maximum number of permissible rays 930 have been cast (e.g., twenty-four rays 930). If so, the ray-casting technique for that fringe cell 930ƒ ends. If not, the technique proceeds to remove the first ray from the queue ("it is popped"). The ray is then cast. An intersection test can then be performed for each analytical face and the casted ray.

A first quick-rejection test of bounding boxes can then be performed between the minimum and maximum grid cells 502 computed earlier for each analytical face, and the currently-visited cell 502ƒ and its first-neighbor cells. Again, because particular implementations utilize simple arithmetic using integer values, these intersection and rejection tests will be computationally efficient and fast. This vicinity test can ensure that all, or substantially all, possible gaps or variations in the model are considered because the rays 930 can only intersect ("hit") analytical faces in close proximity. In some implementations, the closest or first analytical face intersected by the ray 930 (or 940 as described below) is considered a hit.

For example, when a ray 930 (or 940) hits an analytical face within the bounding box, the reference to the respective bounding element for which the analytical face was generated, can then be added to a bounding element repository for the current cluster (e.g., connected region) collection at 126. That is, unless the respective analytical face hasn't already been intersected ("found") by an earlier-cast ray 930 (or 940). That analytical face is thus identified as exterior and the corresponding bounding element is thus identified as an exterior bounding element.

In some implementations, when a primary ray 930 hits an analytical face, a specular ray 940 is computed and added to the queue of rays to be processed and cast. Casting specular rays 940 is useful in various implementations in finding small gaps or variations in the resulting building envelope 1000, illustrated in FIG. 10, that the first primary rays 930 won't catch or see depending upon the cell size value.

In some implementations, as briefly described earlier, when a specular ray 940 hits an analytical face, another specular ray 940 can be computed from that specular ray intersection and then added to the queue of rays to be processed and cast. The number of specular ray reflections or iterations that can originate from a single primary ray 930 can be limited (e.g., two, three, four, five, ten, twenty-four or more iterations). Generally, having a greater number of iterations can potentially increase the visibility of the ray-casting technique 124; that is, the ability of technique 100 to find gaps or variations of ever-smaller size in the analytical model 200 and resulting building envelope 1000. Generally, because ray casting is computationally efficient and fast, increasing the number of iterations (e.g., number of specular rays allowed to originate from a single primary ray 930) can permit a larger cell size to be used while maintaining a specified or desired visibility or granularity.

The technique then repeats with checking whether there is another ray in the queue.

Finally, in various implementations, the analytical elements that were identified at 126 as exterior can then be summed or otherwise combined to generate an analytical building shell or building envelope 1000 at 128. In other implementations, the originating bounding elements for which the exterior analytical faces were calculated can also then be used in various computations, e.g., shading operations.

Figure 10:
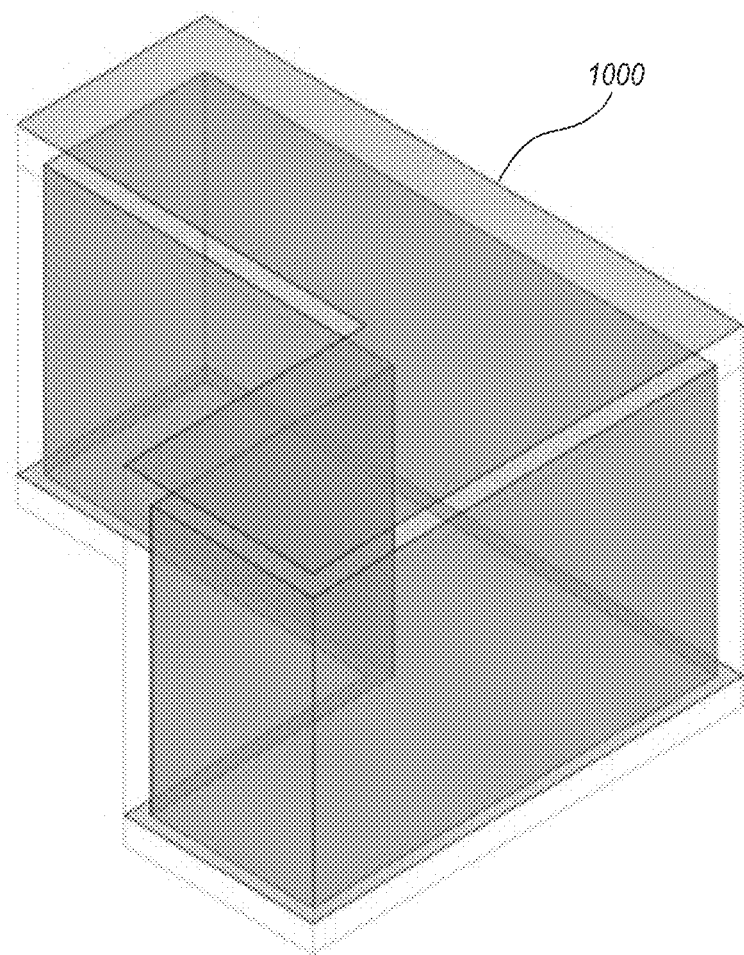
FIG. 10 illustrates an example building envelope obtained for the example structure of FIGS. 2A-B based on the ray casting performed as described with reference to FIGS. 9A-B.

FIG. 10 illustrates the example building envelope 1000 obtained for the example structure of FIGS. 2A-B based on the ray casting performed as described with reference to FIGS. 9A-B.

Figure 11:
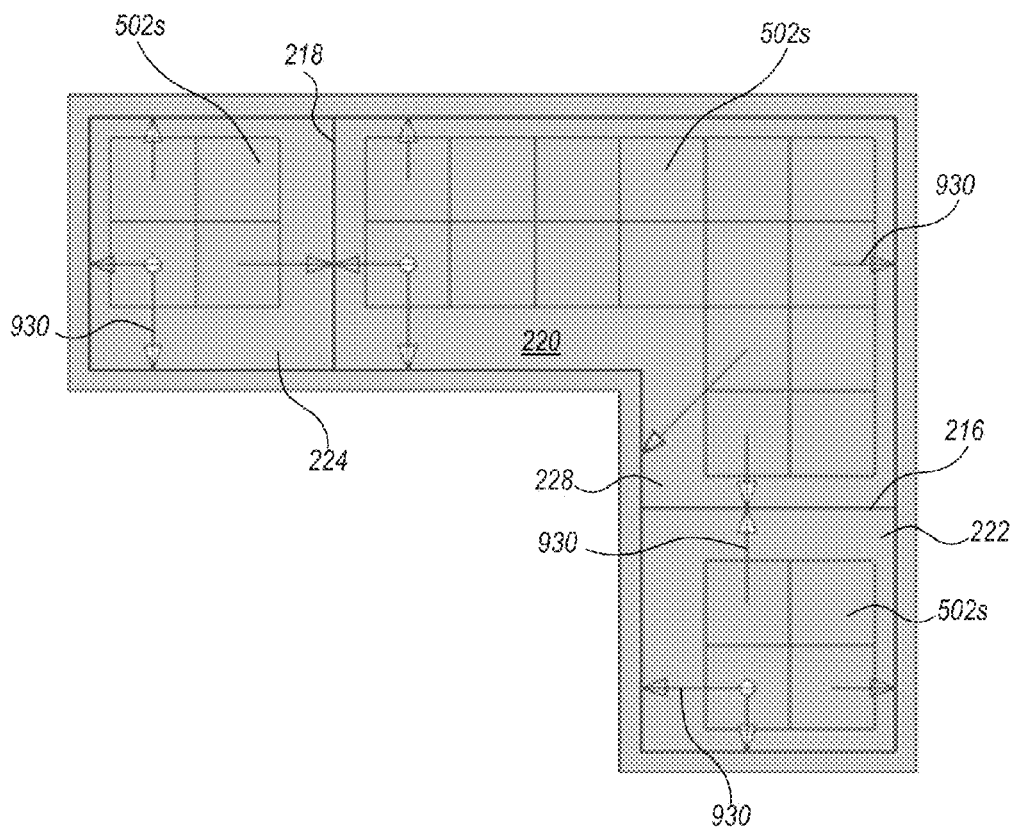
FIG. 11 illustrates an example implementation in which flood-fill algorithm and ray casting techniques are used on other grid cells within the analytical faces and bounding elements of the example structure of FIGS. 2A-B.

FIG. 11 illustrates an example implementation in which the example flood-fill algorithm and ray casting techniques described above are expanded to be executed on other not-yet visited grid cells 502 within the analytical faces and exterior bounding elements identified above in step 126. These additional operations or inclusions can be used to find, for example, interior bounding elements 216, 218, and 220, defining spatial volumes 222, 224, 226, and 228, or both. In some implementations, this can be accomplished by finding the first grid cell 502 not marked as visited after the earlier flood-fill algorithm was executed at 122, and then by executing a second flood-fill algorithm to find the connected region of spatial cells from the currently visited cell. In this way, the technique 100 can be expanded to find the interior regions from the spatial grid cells 502s inside the building model.

Figure 14:
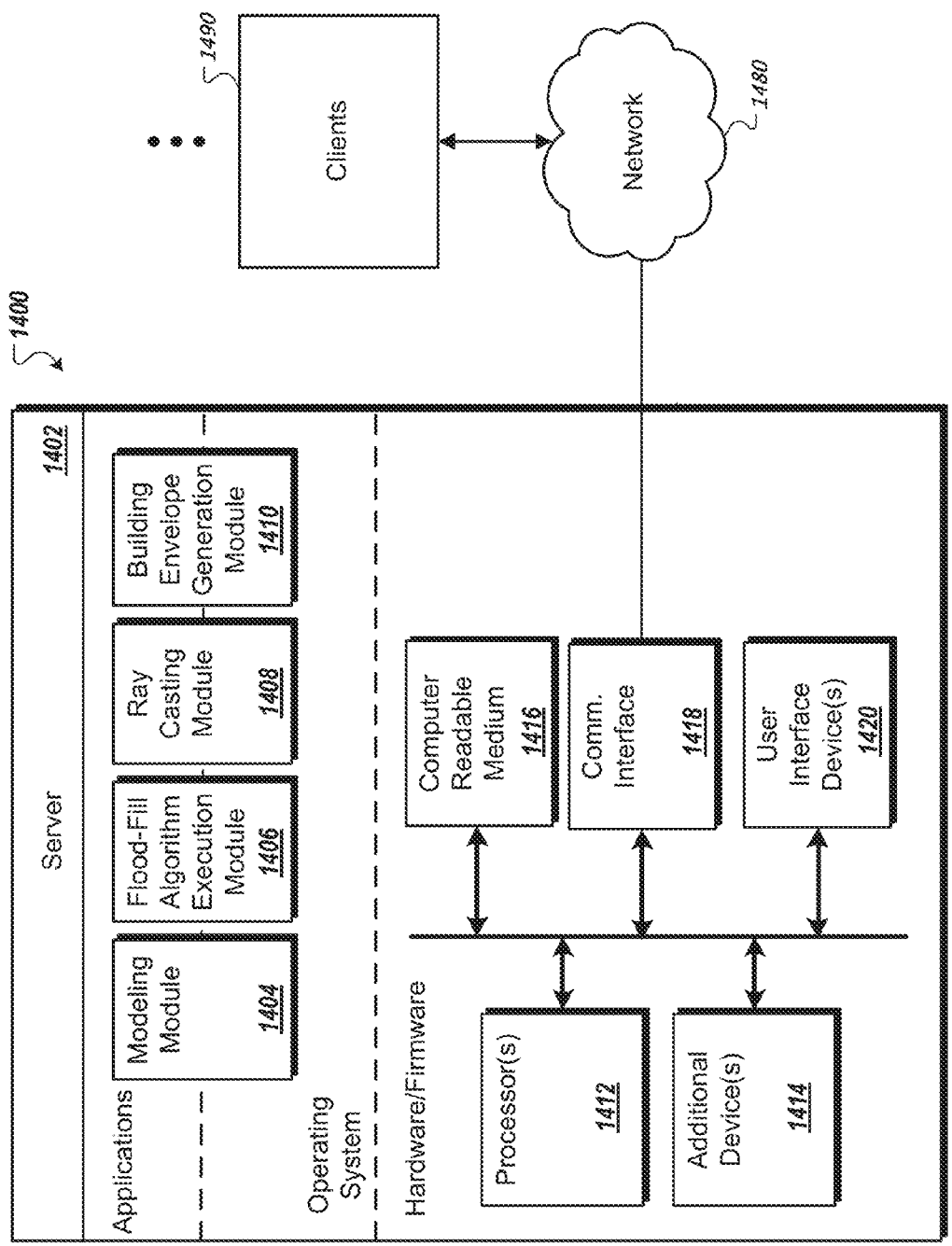
FIG. 14 illustrates a schematic diagram of an example system configured to determine or generate a building envelope.

FIG. 14 illustrates a schematic diagram of an example system configured to determine or generate a building envelope. The system generally consists of a server 1402. The server 1402 is optionally connected to one or more user or client computers 1490 through a network 1480. The server 1402 consists of one or more data processing apparatuses. While only one data processing apparatus is shown in FIG. 14, multiple data processing apparatus can be used. The server 1402 includes various modules, e.g. executable software programs, including a modeling module 1404 for generating, receiving, or adjusting building model 200, generating analytical representation 300, and generating first total bounding box 301, shell bounding box 400, and grid 500. A flood-fill algorithm execution module 1406 is configured to execute the one or more flood-fill algorithms described above on the analytical representation 300 and grid 500. A ray casting module 1408 is configured to compute and cast the primary rays 930 and specular rays 940 described above to determine the exterior faces. The building envelope generation module 1410 then generates a building envelope based on the output of ray casting module 1408.

Each module runs as part of the operating system on the server 1402, runs as an application on the server 1402, or runs as part of the operating system and part of an application on the server 1402, for instance. Although several software modules are illustrated, there can be fewer or more software modules. Moreover, the software modules can be distributed on one or more data processing apparatus connected by one or more networks or other suitable communication mediums.

The server 1402 also includes hardware or firmware devices including one or more processors 1412, one or more additional devices 1414, a computer readable medium 1416, a communication interface 1418, and one or more user interface devices 1420. Each processor 1412 is capable of processing instructions for execution within the server 1402. In some implementations, the processor 1412 is a single or multi-threaded processor. Each processor 1412 is capable of processing instructions stored on the computer readable medium 1416 or on a storage device such as one of the additional devices 1414. The server 1402 uses its communication interface 1418 to communicate with one or more computers 1490, for example, over a network 1480. Examples of user interface devices 1420 include a display, a camera, a speaker, a microphone, a tactile feedback device, a keyboard, and a mouse. The server 1402 can store instructions that implement operations associated with the modules described above, for example, on the computer readable medium 1416 or one or more additional devices 1414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by data processing apparatus, the method comprising:
    generating a respective two-dimensional analytical face to represent each bounding element of a plurality of bounding elements that form at least a part of an analytical model; generating a three-dimensional shell bounding box that encompasses the analytical faces, the shell bounding box further comprising a plurality of three-dimensional grid cells arranged within the shell bounding box;
    determining, for each analytical face, one or more sample points on the analytical face;
    performing a flood-fill algorithm from a reference one of the grid cells through other ones of the grid cells in the shell bounding box;
    casting one or more primary rays from each one of the grid cells encountered by the flood-fill algorithm that does not contain any of the sample points but that directly neighbors one or more other ones of the grid cells that do contain one or more of the sample points;
    for each casted primary ray, identifying as an exterior face the first analytical face within a vicinity of the grid cell from which the primary ray is cast that is intersected by the casted primary ray; and
    generating a building envelope based on the identified exterior faces.

2. The method of claim 1, wherein generating the respective two-dimensional analytical face to represent each bounding element of the plurality of bounding elements that form at least a part of the analytical model comprises:
    receiving as input a plurality of building elements that collectively form the analytical model; and
    generating, for each of the building elements that is a bounding element, a two-dimensional analytical face to represent the bounding element.

3. The method of claim 2, wherein generating a three-dimensional shell bounding box that encompasses the analytical faces comprises:
    determining a minimum element extent value based on one or more of the bounding elements; and
    generating a three-dimensional grid within the shell bounding box that comprises the plurality of grid cells, wherein the plurality of grid cells collectively fill the shell bounding box, each one of the grid cells having a dimension based on the minimum element extent value.

4. The method of claim 3, wherein generating a three-dimensional shell bounding box that encompasses the analytical faces comprises:

generating a first bounding box that encompasses the bounding elements based on the bounding elements such that the first bounding box is separated from the analytical face closest to the first bounding box by at least the minimum element extent value;

determining a cell size value based on the minimum element extent value; and generating the shell bounding box such that the shell bounding box encompasses the first bounding box by at least the cell size value at all portions of the shell bounding box and such that each one of the grid cells has a dimension equal to the cell size value.

5. The method of claim 1, wherein casting one or more primary rays from each one of the grid cells encountered by the flood-fill algorithm that does not contain any of the sample points but that directly neighbors one or more other ones of the grid cells that do contain one or more of the sample points comprises:

identifying as a bounding element cell that is not in a space, each grid cell that contains a sample point;

identifying as a fringe cell, each grid cell encountered by the flood-fill algorithm that is not a bounding element cell but that directly neighbors one or more of the bounding element cells; and casting the one or more primary rays from each one of the fringe cells.

6. The method of claim 5, further comprising:

for each casted primary ray that intersects an analytical face, calculating a specular reflected ray based on the casted primary ray;

casting the respective specular reflected ray; and identifying as an exterior face the first analytical face intersected by the casted specular ray that is not also intersected by any one of the casted primary rays.

7. The method of claim 6, wherein casting one or more rays from each one of the fringe cells comprises casting the one or more rays from a center point of the fringe cell, and wherein casting one or more rays from the center point of the fringe cell comprises casting a first primary ray perpendicularly through each face of the fringe cell.

8. The method of claim 7, further comprising:

for each first primary ray that is not directed along a first axis that passes through the center point of the fringe cell and that is perpendicular to a first face of the fringe cell, casting a second primary ray along a direction that is 45 degrees rotated about the first axis;

for each first primary ray that is not directed along a second axis that passes through the center point of the fringe cell and that is perpendicular to a second face of the fringe cell that is perpendicular to the first face, casting a third primary ray along a direction that is 45 degrees rotated about the second axis; and for each first primary ray that is not directed along a third axis that passes through the center point of the fringe cell and that is perpendicular to both the first and second axes, casting a fourth primary ray along a direction that is 45 degrees rotated about the third axis.

9. The method of claim 8, further comprising:

for each second primary ray and third primary ray, casting a fifth primary ray along a direction that is 45 degrees rotated about the third axis.

10. The method of claim 1, wherein casting one or more primary rays from each one of the grid cells encountered by the flood-fill algorithm that does not contain any of the sample points but that directly neighbors one or more other ones of the grid cells that do contain one or more of the sample points comprises casting the one or more primary rays in randomly-generated directions from each one of the grid cells.

11. A non-transitory computer storage medium encoded with instructions which, when executed by data processing apparatus, cause the data processing apparatus to perform operations comprising:

generating a respective two-dimensional analytical face to represent each bounding element of a plurality of bounding elements that form at least a part of an analytical model;

generating a three-dimensional shell bounding box that encompasses the analytical faces, the shell bounding box further comprising a plurality of three-dimensional grid cells arranged within the shell bounding box;

determining, for each analytical face, one or more sample points on the analytical face;

performing a flood-fill algorithm from a reference one of the grid cells through other ones of the grid cells in the shell bounding box;

casting one or more primary rays from each one of the grid cells encountered by the flood-fill algorithm that does not contain any of the sample points but that directly neighbors one or more other ones of the grid cells that do contain one or more of the sample points;

for each casted primary ray, identifying as an exterior face the first analytical face within a vicinity of the grid cell from which the primary ray is cast that is intersected by the casted primary ray; and generating a building envelope based on the identified exterior faces.

12. The storage medium of claim 11, wherein generating the respective two-dimensional analytical face to represent each bounding element of the plurality of bounding elements that form at least a part of the analytical model comprises:

receiving as input a plurality of building elements that collectively form the analytical model; and generating, for each of the building elements that is a bounding element, a two-dimensional analytical face to represent the bounding element.

13. The storage medium of claim 12, wherein generating a three-dimensional shell bounding box that encompasses the analytical faces comprises:

determining a minimum element extent value based on one or more of the bounding elements; and generating a three-dimensional grid within the shell bounding box that comprises the plurality of grid cells, wherein the plurality of grid cells collectively fill the shell bounding box, each one of the grid cells having a dimension based on the minimum element extent value.

14. The storage medium of claim 13, wherein generating a three-dimensional shell bounding box that encompasses the analytical faces comprises:

generating a first bounding box that encompasses the bounding elements based on the bounding elements such that the first bounding box is separated from the analytical face closest to the first bounding box by at least the minimum element extent value;

determining a cell size value based on the minimum element extent value; and generating the shell bounding box such that the shell bounding box encompasses the first bounding box by at least the cell size value at all portions of the shell bounding box and such that each one of the grid cells has a dimension equal to the cell size value.

15. The storage medium of claim 11, wherein casting one or more primary rays from each one of the grid cells encountered by the flood-fill algorithm that does not contain any of the sample points but that directly neighbors one or more other ones of the grid cells that do contain one or more of the sample points comprises:
- identifying as a bounding element cell that is not in a space, each grid cell that contains a sample point;
- identifying as a fringe cell, each grid cell encountered by the flood-fill algorithm that is not a bounding element cell but that directly neighbors one or more of the bounding element cells; and
- casting the one or more primary rays from each one of the fringe cells.

16. The storage medium of claim 15, the operations further comprising:
- for each casted primary ray that intersects an analytical face,
  - calculating a specular reflected ray based on the casted primary ray;
  - casting the respective specular reflected ray; and
  - identifying as an exterior face the first analytical face intersected by the casted specular ray that is not also intersected by any one of the casted primary rays.

17. The storage medium of claim 16, wherein casting one or more rays from each one of the fringe cells comprises casting the one or more rays from a center point of the fringe cell, and wherein casting one or more rays from the center point of the fringe cell comprises casting a first primary ray perpendicularly through each face of the fringe cell.

18. The storage medium of claim 17, the operations further comprising:
- for each first primary ray that is not directed along a first axis that passes through the center point of the fringe cell and that is perpendicular to a first face of the fringe cell, casting a second primary ray along a direction that is 45 degrees rotated about the first axis;
- for each first primary ray that is not directed along a second axis that passes through the center point of the fringe cell and that is perpendicular to a second face of the fringe cell that is perpendicular to the first face, casting a third primary ray along a direction that is 45 degrees rotated about the second axis; and
- for each first primary ray that is not directed along a third axis that passes through the center point of the fringe cell and that is perpendicular to both the first and second axes, casting a fourth primary ray along a direction that is 45 degrees rotated about the third axis.

19. The storage medium of claim 18, the operations further comprising:
- for each second primary ray and third primary ray, casting a fifth primary ray along a direction that is 45 degrees rotated about the third axis.

20. The storage medium of claim 11, wherein casting one or more primary rays from each one of the grid cells encountered by the flood-fill algorithm that does not contain any of the sample points but that directly neighbors one or more other ones of the grid cells that do contain one or more of the sample points comprises casting the one or more primary rays in randomly-generated directions from each one of the grid cells.

21. A system comprising data processing apparatus and a storage medium encoded with instructions which, when executed by the data processing apparatus, cause the data processing apparatus to perform operations comprising:
- generating a respective two-dimensional analytical face to represent each bounding element of a plurality of bounding elements that form at least a part of an analytical model
- generating a three-dimensional shell bounding box that encompasses the analytical faces, the shell bounding box further comprising a plurality of three-dimensional grid cells arranged within the shell bounding box;
- determining, for each analytical face, one or more sample points on the analytical face;
- performing a flood-fill algorithm from a reference one of the grid cells through other ones of the grid cells in the shell bounding box;
- casting one or more primary rays from each one of the grid cells encountered by the flood-fill algorithm that does not contain any of the sample points but that directly neighbors one or more other ones of the grid cells that do contain one or more of the sample points;
- for each casted primary ray, identifying as an exterior face the first analytical face within a vicinity of the grid cell from which the primary ray is cast that is intersected by the casted primary ray; and
- generating a building envelope based on the identified exterior faces.

22. The system of claim 21, wherein generating the respective two-dimensional analytical face to represent each bounding element of the plurality of bounding elements that form at least a part of the analytical model comprises:
- receiving as input a plurality of building elements that collectively form the analytical model; and
- generating, for each of the building elements that is a bounding element, a two-dimensional analytical face to represent the bounding element.

23. The system of claim 22, wherein generating a three-dimensional shell bounding box that encompasses the analytical faces comprises:
- determining a minimum element extent value based on one or more of the bounding elements; and
- generating a three-dimensional grid within the shell bounding box that comprises the plurality of grid cells, wherein the plurality of grid cells collectively fill the shell bounding box, each one of the grid cells having a dimension based on the minimum element extent value.

24. The system of claim 23, wherein generating a three-dimensional shell bounding box that encompasses the analytical faces comprises:
- generating a first bounding box that encompasses the bounding elements based on the bounding elements such that the first bounding box is separated from the analytical face closest to the first bounding box by at least the minimum element extent value;
- determining a cell size value based on the minimum element extent value; and
- generating the shell bounding box such that the shell bounding box encompasses the first bounding box by at least the cell size value at all portions of the shell bounding box and such that each one of the grid cells has a dimension equal to the cell size value.

25. The system of claim 21, wherein casting one or more primary rays from each one of the grid cells encountered by the flood-fill algorithm that does not contain any of the sample points but that directly neighbors one or more other ones of the grid cells that do contain one or more of the sample points comprises:
- identifying as a bounding element cell that is not in a space, each grid cell that contains a sample point;
- identifying as a fringe cell, each grid cell encountered by the flood-fill algorithm that is not a bounding element cell but that directly neighbors one or more of the bounding element cells; and casting the one or more primary rays from each one of the fringe cells.

26. The system of claim 25, the operations further comprising:
for each casted primary ray that intersects an analytical face,
calculating a specular reflected ray based on the casted primary ray;
casting the respective specular reflected ray; and
identifying as an exterior face the first analytical face intersected by the casted specular ray that is not also intersected by any one of the casted primary rays.

27. The system of claim 26, wherein casting one or more rays from each one of the fringe cells comprises casting the one or more rays from a center point of the fringe cell, and wherein casting one or more rays from the center point of the fringe cell comprises casting a first primary ray perpendicularly through each face of the fringe cell.

28. The system of claim 27, the operations further comprising:
for each first primary ray that is not directed along a first axis that passes through the center point of the fringe cell and that is perpendicular to a first face of the fringe cell, casting a second primary ray along a direction that is 45 degrees rotated about the first axis;
for each first primary ray that is not directed along a second axis that passes through the center point of the fringe cell and that is perpendicular to a second face of the fringe cell that is perpendicular to the first face, casting a third primary ray along a direction that is 45 degrees rotated about the second axis; and
for each first primary ray that is not directed along a third axis that passes through the center point of the fringe cell and that is perpendicular to both the first and second axes, casting a fourth primary ray along a direction that is 45 degrees rotated about the third axis.

29. The system of claim 28, the operations further comprising:
for each second primary ray and third primary ray, casting a fifth primary ray along a direction that is 45 degrees rotated about the third axis.

30. The system of claim 21, wherein casting one or more primary rays from each one of the grid cells encountered by the flood-fill algorithm that does not contain any of the sample points but that directly neighbors one or more other ones of the grid cells that do contain one or more of the sample points comprises casting the one or more primary rays in randomly-generated directions from each one of the grid cells.

* * * * *